United States Patent [19]

Bordry et al.

[11] Patent Number: 5,130,793
[45] Date of Patent: Jul. 14, 1992

[54] RECONFIGURABLE MULTIPLE-POINT WIRED IN-HOUSE NETWORK FOR SIMULTANEOUS AND/OR ALTERNATIVE DISTRIBUTION OF SEVERAL TYPES OF SIGNALS, NOTABLY BASEBAND IMAGES, AND METHOD FOR THE CONFIGURATION OF A SYSTEM SUCH AS THIS

[75] Inventors: Hervé Bordry, Rennes; Daniel Bottin, Chateaugiron; Daniel Pace, Rennes, all of France

[73] Assignees: Etat Francais, Issy Les Moulineaux; Telediffusion de France, Montrouge, both of France

[21] Appl. No.: 383,173

[22] Filed: Jul. 20, 1989

[30] Foreign Application Priority Data

Jul. 27, 1988 [FR] France ............................. 88 10101

[51] Int. Cl.⁵ ............................................. H04N 7/10
[52] U.S. Cl. ............................. 358/86; 455/5.1; 455/6.1; 375/14
[58] Field of Search ............. 455/3, 5, 6; 358/86; 333/18, 26 R; 375/12, 14

[56] References Cited

U.S. PATENT DOCUMENTS

| | | | |
|---|---|---|---|
| 3,594,496 | 7/1971 | Parton | 358/86 |
| 4,273,963 | 6/1981 | Seidel | 375/14 |
| 4,760,442 | 7/1988 | O'Connell et al. | 455/5 |

Primary Examiner—Curtis Kuntz
Assistant Examiner—Edward Urban
Attorney, Agent, or Firm—Roland Plottel

[57] ABSTRACT

A transmission line formed by a twisted pair of conductors with at least one input point for connection to a device for injection of a signal into the pair of conductors, and several output points for connection to devices for tapping of the signal transmitted on the pair of conductors. Each of the points has means for symmetrical tapping of the signal on the two wires of the pair. The tapping means has a high impedance with respect to the impedance of the pair of conductors, and is compatible with a multiple tapping of the signal on the pair of conductors. This transmission line permits the transmission of signals emitted in wideband, such as baseband video signals over distances of several hundreds of meters, with multiple tapping of a signal on one and the same line of the network, without causing any mismatching phenomena.

19 Claims, 6 Drawing Sheets

RECONFIGURABLE MULTIPLE-POINT WIRED IN-HOUSE NETWORK FOR SIMULTANEOUS AND/OR ALTERNATIVE DISTRIBUTION OF SEVERAL TYPES OF SIGNALS, NOTABLY BASEBAND IMAGES, AND METHOD FOR THE CONFIGURATION OF A SYSTEM SUCH AS THIS

BACKGROUND OF THE INVENTION

1. Field of the Invention

The field of the invention is that of wired networks for the distribution of signals, notably for the simultaneous and/or alternative distribution of several types of signals including, notably, audio-visual signals comprising, among others, baseband image signals or, again, computer data. This type of network is designed essentially for in-house applications, for example for the setting up of internal networks for the distribution of signals in individual or group dwellings, firms etc.

2. Description of the Prior Art

This type of network is formed by wired transmission lines running between the connection points of data emitting and receiving devices. Several emitters can simultaneously feed the network with data available for the receivers.

One of the essential characteristics of networks of this type is that they have to permit the establishing of multiple-point links through which several receivers of the network simultaneously tap one and the same signal coming from a common emitter on the network. A network such as this should furthermore be capable of simultaneously routing several multiple-point links of this type simultaneously.

Another essential characteristic of these networks is that they should offer a possibility of easy configuration of the established links, making it possible to cope with the shifting or addition of emitting or receiving instruments to the network. They should also offer a facility of selective connection, of each receiver connected to the network, to the signals emitted by one emitter or another in the network.

There are numerous transmission systems for audio-visual signals, using different media such as coaxial cables or optic fibers. These known systems set up point-to-point links, for which the signals are available solely at the ends of the medium.

Furthermore, existing media designed to transmit signals of images in baseband are operational over only a few meters. This is the case for TV peripheral cords which cannot go beyond a few meters. When it is sought to broadcast signals in a dwelling, it has therefore been deemed to be necessary, until now, to make use of a cascade of point-to-point links or, again, to use distributors associated with point-to-point links. It is also possible to set up systems that work by multiplexing, the price of this being a relative complexity.

Furthermore, there is a known method for the simultaneous transfer of signals among modules of an electronic unit, as described in the French Pat. No. 86 05759 filed on Apr. 22, 1986, on behalf of Isaac Lellouche. The method of this prior art document consists in linking the electronic modules by useful signals transmission lines, and lines for the transmission of control signals for the interconnection of the modules, this interconnection being provided by switching matrices interposed between each module and the lines for the useful signals transmission lines. Each interconnection state can be configured, on a point-to-point basis, by means of codes for the definition of each connection transmitted on the control line.

This known method is described more precisely in relation with the making of interconnected rack, frame or rack wirings. In this type of application, the length of the links does not exceed one meter. Moreover, this method is not suited to the simultaneous transmission of several different types of signals.

The adaptation of a system such as this and, more generally, the making of an audio-visual signals transmission network, in in-house application, raises a number of problems.

Thus, an approach must to be found, enabling the transmission of signals emitted in wideband, such as baseband video signals, over distances of several tens of meters.

It is also necessary to find an approach to the problem of the multiple tapping of a signal on one and the same network line, without causing mismatching phenomena.

Finally, means and procedures must be provided for the identification and interconnection of the devices connected to the network, liable to be used by the user of the in-house network.

SUMMARY OF THE INVENTION

An aim of the invention, notably, is to overcome the various drawbacks of the existing systems presented further above and to resolve, among others, the above-mentioned problems.

These aims, as well as others which will appear further below, are achieved by means of a reconfigurable in-house multiple-point wired network for the simultaneous and/or alternative distribution of several types of data including, notably, audio-visual signals comprising, among others, baseband image signals, among sets of devices each comprising at least one unit for the injection of signals into the network and at least one unit for the reception of said signals, said units being each capable of being connected, without distinction, at different connection points of the network, a network of the type formed by at least one line for the transmission of said signals provided with connection points of said units to the network, distributed over the length of said line;

wherein each transmission line is formed by a twisted pair of conductors comprising at least one input point for the connection of a unit for the injection of a signal into said conductor pair, and several output points for the connection of units for tapping said signal transmitted on the pair of conductors, wherein each of said output points comprises means for the symmetrical tapping of the signal on the two wires of said pair, and wherein said tapping means have a high impedance with respect to the impedance of said pair of conductors, compatible with a multiple tapping of the signal on the pair of conductors.

Advantageously, each of the connection points is an input/output point comprising, at the same time, firstly, means for the injection of a signal into said pair of conductors and, secondly, means for the low level tapping of the signal transmitted on said pair of conductors, as well as means for the selection of the operation mode of said connection point, in injection and/or in reception.

Advantageously, each of said connection points comprises adjustable means for equalization of the level of the signal received with respect to the signal injected into the network, as a function of the electrical distance between said output point and the injection point of the signal in said pair of wires.

These equalization means are formed, for example, by means for the memorization, at each connection point, of its electrical distance with reference to a single reference point on said pair of conductors, and means for the computation of the electrical distance between two connection points of said pair of conductors by algebraic substraction of their respective distance from said reference point.

· Alternatively, the equalization means comprise:

means for the temporary short-circuiting of a line at one of the first of said injection connection points, means for measuring the electrical resistance of said short-circuited line, seen from the second of said connection points;

means for selection of an adjusted value of equalization as a function of said measured electrical resistance.

Advantageously, said equalization means comprise distinct, selectively switchable, equalization cells, alone or in combination, as a function of said electrical distance, namely electrical resistance measured respectively.

The combination of the principle of tapping wideband signals symmetrically on pairs of conductors twisted together (hereinafter called "twisted pairs" of conductors) and the application of equalization means adjustable according to the distance travelled by the signals gives an in-house network which is perfectly suited to the simultaneous transmission of digital and analog signals of all types including, notably, audio-visual and telephone signals. It takes into account the advent of new audio-visual encoding (MAC, HDTV) and telephone transmission (ISDN) technologies into account.

Depending on the type of cable used, the length of the network ranges from some meters to several hundreds of meters.

According to anoher major characteristic of the invention, the network comprises:

a bunch of lines formed, firstly, by several twisted pairs of conductors and, secondly, by at least one signalling line, a set of connection sockets with multiple contacts, each connection contact of which is connected to a pair of conductors of said bunch;

a set of multiple-contact connectors for the connection of said units, each having connection elements dedicated to the transmission/reception of a specific signal per type of unit;

a set of switching matrices, each matrix being interposed between a connection socket and an associated connector for the selective and reconfigurable making of contact of each connection element of the unit connector with the connection contact of the socket connected to the pair of conductors carrying the corresponding signal to said dedicated connection elements;

means for the control of each of said switching matrices, for setting up and breaking each unit connection with the network, comprising, firstly, means to emit control signals on said signalling line and, secondly, a control element specific to each switching matrix connected to said signalling line.

Said means for emitting control signals are formed, for example, by a videotex type emitting instrument, which can be connected at any point of the network or, again, by a piece of supervisory equipment capable of creating automatic connections.

Another object of the invention is a method for the configuration of these networks, according to which each device connected to a connection point of the network is managed from a logic address formed by an item of information on type of device and, hence, a piece of information for identifying the position of each of the connection elements dedicated to the connector of said instrument, and a specific piece of information on the individual identification of said device.

According to the invention, the configuration method comprises an iterative procedure for assigning a specific identification number to each newly connected device, and procedures for requesting connection and disconnection between an emitter and a receiver of the network.

According to another characteristic of the invention, said signalling line is used for the broadcasting of slow switching information during the transmission of image signals in Peritelevision, as well as for the transmission of information for the remote control of emitters in the network.

BRIEF DESCRIPTION OF THE DRAWINGS

Other features and advantages of the invention will appear from the following description of a preferred embodiment, given as an illustration and on a non-restrictive basis, and from the appended drawings, wherein.

DESCRIPTION OF A PREFERRED EMBODIMENT

The preferred embodiment shown below corresponds to the making of a domestic audio-visual bus used to exploit analog or digital baseband audio-visual signals. The signals transmitted may be, for example, audio, video, instrument remote control, remote monitoring or indication signals. These signals may be processed separately or in combination for audio-visual or computer communications type applications, or applications relating to the use of automation or safety systems.

The domestic audio-visual bus thus enables the dynamic interconnection of widely used audio-visual devices, distributed over the dwelling (such as television sets, video tape-recorders, HIFI chains, cameras, monitoring microphones, etc.).

In making the physical positions of the connectors with the external networks (video communications networks) unimportant, it resolves, in particular, the problems of the mutual location, in the domestic space, of items of equipment that are normally paired or designed to work in association (for example, decoders and television sets or video tape recorders and television sets).

The domestic bus, which is a logical extension of the external telecommunications and broadcasting networks, enables the broadcasting, throughout the dwelling, of internal audio-visual programs (HIFI chain, video recorder, video camera programs, etc.) or external programs (for example, cable network programs). For example, it enables the video cassette being read by the video recorder in the drawing room to be viewed in the bedroom, or the services of a videotex system to be consulted on a large color screen of a television set.

It also makes it possible to exploit all the characteristics of the signals coming from the standardized connectors with which all audio visual devices are fitted out. By preventing a cascade of processing operations (modulation, selection, demodulation), it provides for maintaining the quality of the signals while, at the same time, doing way with the constraints imposed by the standards in which they are available (PAL, SECAM, NTSC, D2-MAC/Packet). In connecting up usually independent external networks at the subscriber's home, it promotes more efficient use of external services and the emergence of new broadcast or interactive services (for example, the coupling of the HIFI chain sound channel to a television picture).

This is a simple, economical and evolving approach that makes it easy to add on and move connectors providing access to the network, thus providing for very great flexibility of configuration. For this purpose, the domestic audio-visual bus has management mechanisms that are entirely distributed all along the bus at connection points that receive standardized digital messages by broadcasting. Each connection point monitors its own resources in the network. Wideband connection locking means may be provided for. Priority mechanisms may be used in the event of saturation of the bus or busy status of the terminals to provide priority services.

Figure 1:
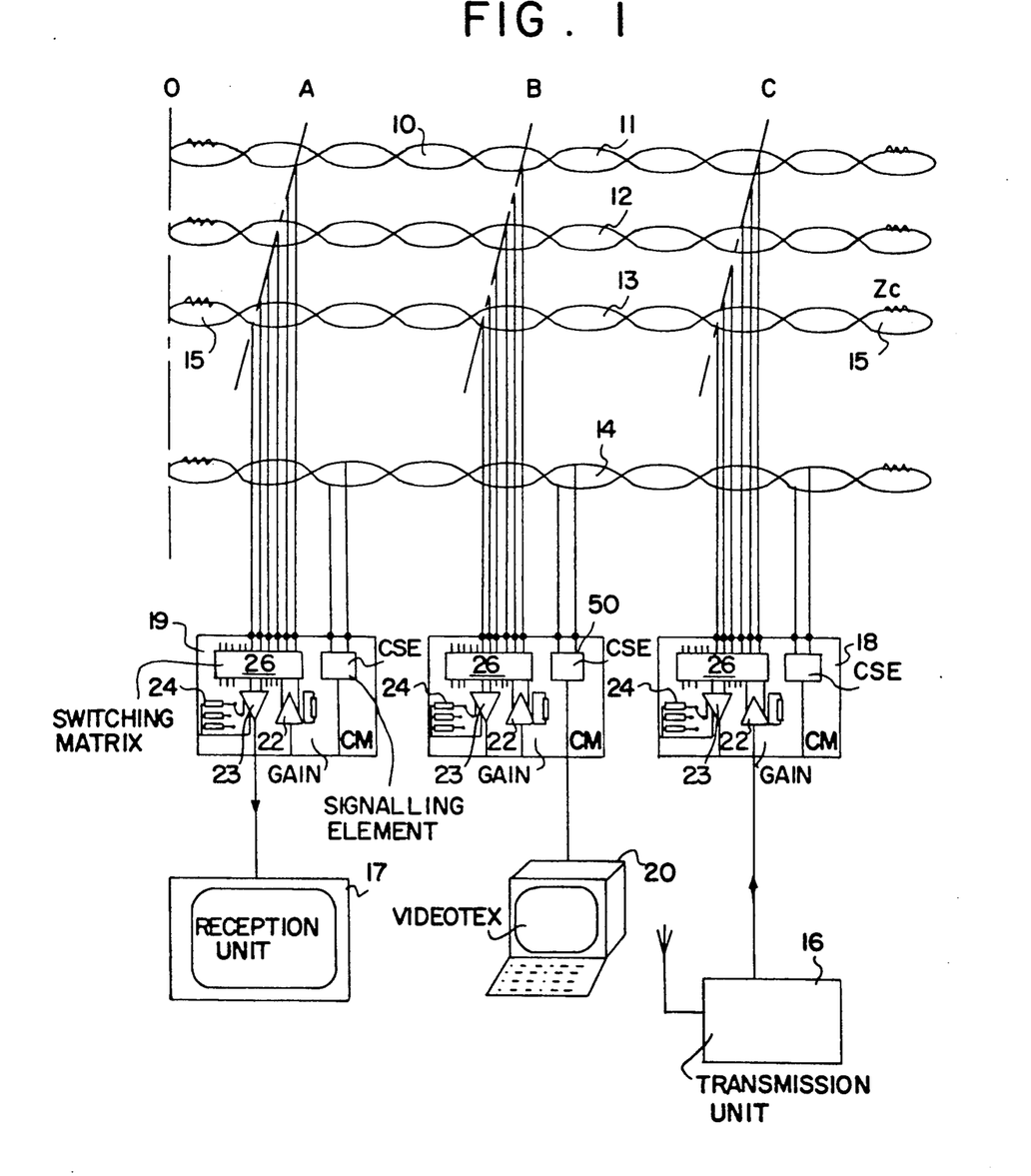
FIG. 1 shows a schematic view of a twisted, multiple-pair network according to the invention.

As shown in FIG. 1, the bus is formed by a bunch 10 of twisted pairs 11, 12, 13, 14 of conductors. Each pair is looped at both its ends to resistors Zc 180 ohms, corresponding to its characteristic impedance.

Advantageously, an intermediate impedance with an appreciably greater value is bridged between the two conductors for each pair of great length, in order to compensate for the effect of resistance per unit length of the conductors (for example an intermediate resistance of 1K ohms for 150 m pairs of copper conductors having a characteristic impedance Zc=120 ohms approximately).

Connection points A, B, C are made in the multiple-pair bunch 10. Their location is unimportant. The sockets for connection to the conductors 11, 12, 13, 14 of the bunch 10 may be connectors of the self-stripping flat-bundle wiring type.

At least one pair 14 of the bunch 10 is assigned to the transmission of signalling control signals, the other pairs 11, 12, 13 providing for the transmission of useful signals.

At each of these connection points, A, B, C, it is possible to provide for the connection of at least one of the following units:

a unit 16 for the injection of a signal on at least one of the twisted pairs 11, 12, 13 of the bunch 10;

a unit 17 for tapping the signal on at least one of the twisted pairs 11, 12, 13;

a control unit 20.

The units 16 and 17, for transmission and reception, respectively, of useful signals on the bunch 10 are connected to the pairs of conductors 11, 12, 13 through modules 18, 19.

The module 18, associated with the unit 16, injects the signal into one or more pairs of wires.

At reception, the matching interface module 19, associated with the receiver 17, taps said signals at the corresponding pairs of conductors, at low level.

To do so, the signals are injected from wideband differential amplifiers having a high source impedance with respect to Zc/2 and tapped, on the receiver 17 side, by wideband differential amplifiers having a very high input impedance with respect to the characteristic impedance Zc/2 of each pair of transmission wires of the useful signal.

Each module 18, 19, acting as a matching interface between the different groups of signals of standardized audio-visual connectors of the audio-visual devices of the units 16, 17 and the bunch 10 of twisted pairs is formed by emitting amplifiers 22, receiver amplifiers 23 provided with equalization cells 24, programmable as a function of distance, and the spatial switching matrices 26.

Figure 2A:
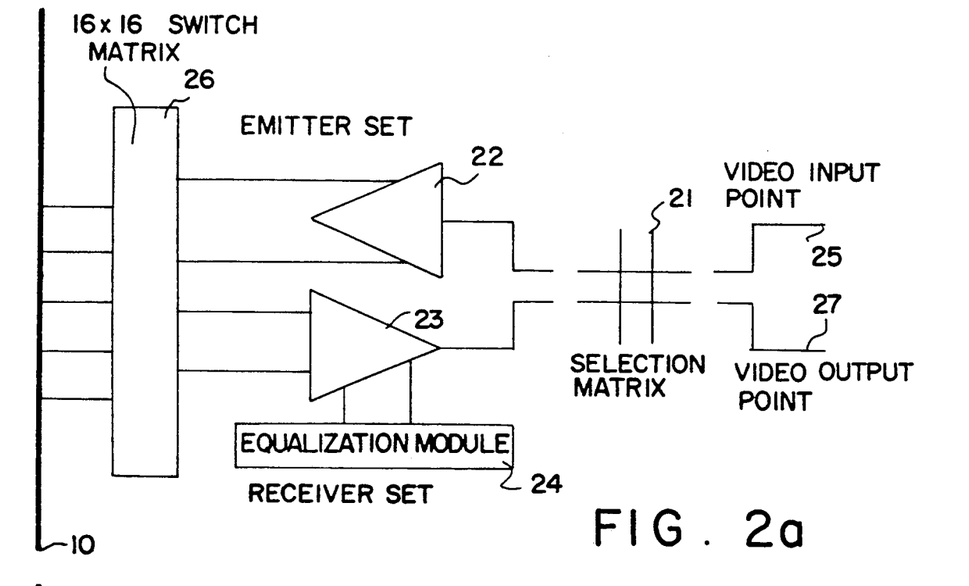
FIGS. 2A, 2B give a schematic view of two embodiments of modules for input/output access to the network, for video signals and audio signals respectively.
Figure 2B:
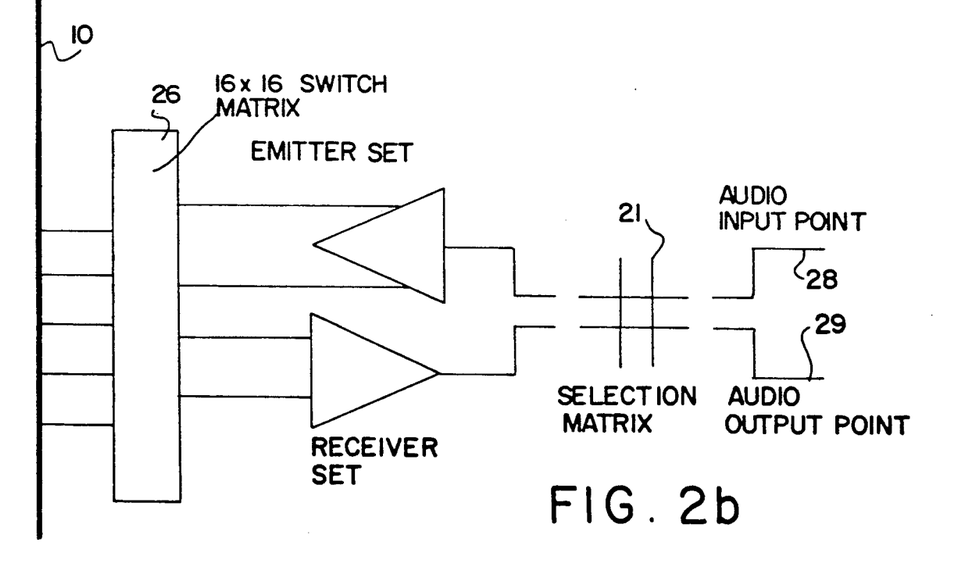

As shown in FIGS. 2A, 2B, these modules 18, 19 are advantageously input/output modules specializing in the emission/reception of audio or video signals.

Each video module (FIG. 2A) consists, firstly, of an emitter set comprising an input point 25 adapted to the Peritelevision standard, an amplifier 22 with common mode input and differential output of the switching matrix 26. Secondly, it has a receiver set comprising a reception amplifier 23 with differential mode input and common mode output, adapted to the Peritelevision standard. This receiver set is provided with equalization cells 24 that are programmable, as a function of the distance between said receiver module, when it is active, and the emitter module to which it is connected through the bunch 10.

The receiver set gives the signal received at the video output point 27. Finally, a selection matrix 21 enables both the sets, the emitter and the receiver, to be used either in a totally bidirectional and independent way or in a one-directional way (emitter or receiver) depending on the nature of the unit connected to the connection point concerned.

Each audio module (FIG. 2B) has a structure analogous to that of the video access modules of FIG. 2A. A selection matrix 21 enables the audio input point 28 and the audio output point 29 to be made active selectively or simultaneously. Unlike the video access module, the receiver set of the audio access module has no equalization cells.

For, the equalization cells are designed to compensate for the losses produced selectively as a function of frequency during the transmission of wideband video signals.

To prevent the appearance of a high degree of sound crosstalk or photonic crosstalk among the signals of the Peritelevision connector which connects the equipment to the connection point, the signals have to be distributed over the different connection points according to their type and their direction.

Figure 3:
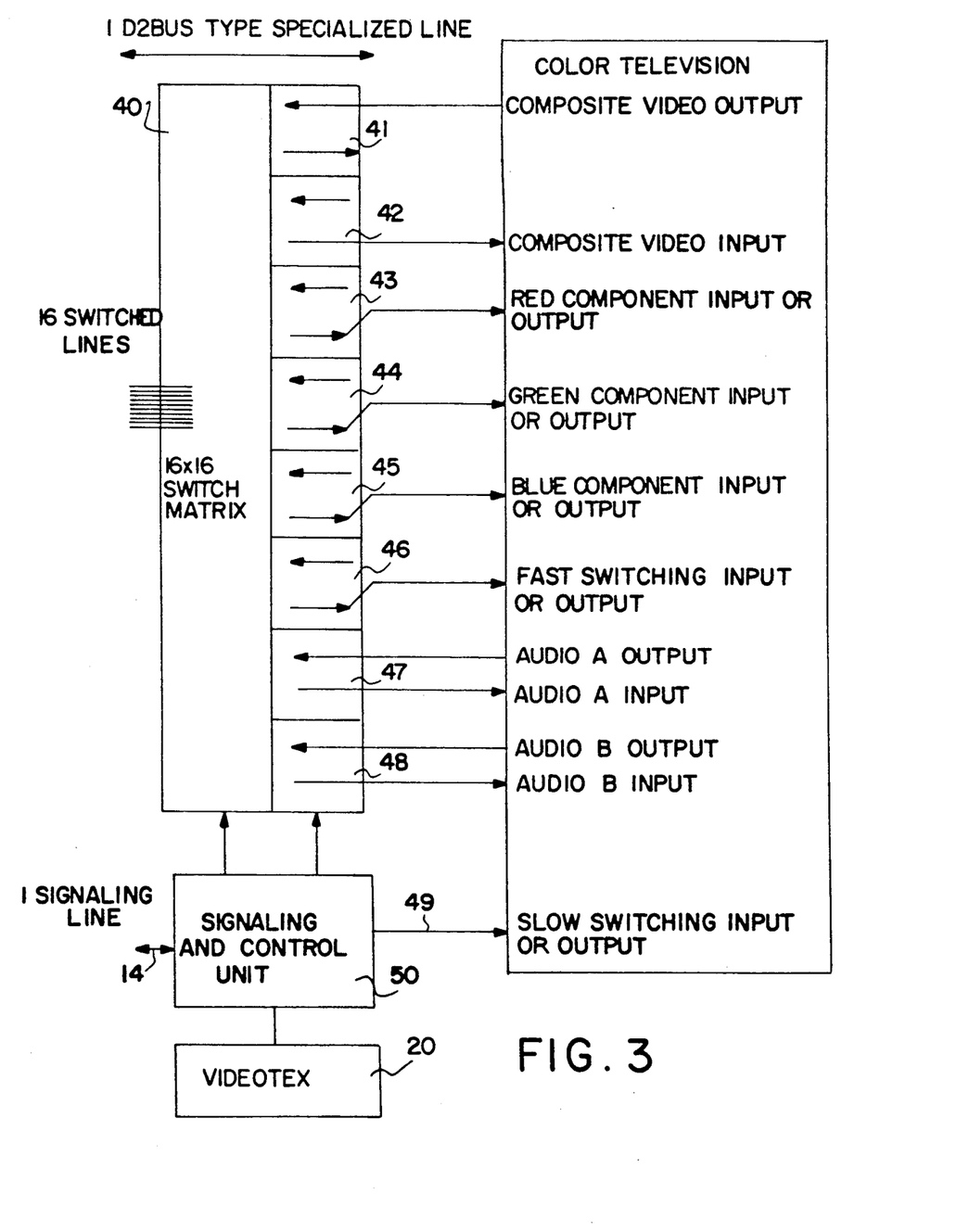
FIG. 3 gives a schematic view of a possible configuration for the connection of an audio-visual terminal of the color television type to a connection point of a network according to invention, with 16 signal transmission lines.

An exemplary configuration of the inputs/outputs of a multiple-contact connector for the connection of devices to a network with 16 pairs of wires is shown in FIG. 3.

In this example, the connected device is a color television set type of device. At the connection point, six video type bidirectional access modules and two sound type bidirectional access modules are used. The example of connection shown is the following one:

module 41 = input point = composite video input;
output point = unused;
module 42 = input point = unused;
output point = composite video output;
module 43 = input point = unused;
output point = red component output;
module 44 = input point = unused;
output point = green component output;
module 45 = input point = unused;
output point = blue component output;
module 46 = input point = unused;
output point = fast switching output
module 47 = input point = audio A input;
output point = audio A output;
module 48 = input point = audio B input;
output point = audio B input.

In the example shown, the television set receives an encrypted source television signal, by its own means, sends it to a decoder through the network (module 41) and receives, in return, the signal decoded into components (modules 42 to 48).

The slow switching information at input/output is advantageously managed from a control and signalling element 50 managing the switch matrix 40 and the signalling line 14.

An access by D2BUS type specialized line is also provided for on the connection point, and used a fixed pair of the bunch 10 of twisted pairs.

The connector of the color television set is a Peritelevision type connector, the connection elements of which are each dedicated to a specific signal (R, G, B, Switch, Fast etc). Now, the transmission of each of these signals may be assigned more or less randomly to any one of the twisted pairs of the bunch 10, when the television set is connected up with the corresponding connector in the network. Consequently, the role of the switch matrix 40 is to shunt each of the video signals, in components, towards the corresponding dedicated connection element of the Peritelevision connector.

This selective switching, performed by the matrix 40, is then done under the control of commands sent on the signalling line 14, and interpreted by the control and signalling element 50, associated with each matrix 40 and, hence, with each connection point in the network.

These control and signalling commands are, for example, injected into the signalling line 14 by a device 20 working in videotex mode and, in general, by any command emitting device (such as a computer terminal, a remote control box etc.).

The twisted pair 14 conveys the control orders broadcast to all the connection points connected to the bunch 10 of pairs, and the remote control commands for the devices connected to the domestic network. Each control and signalling element 50 has a bidirectional control series input to emit commands and receive messages in return, wires transmitting information on status coming from the Peritelevision connector, a microprocessor analyzing the commands and controlling the switch matrix 40, as well as a connection point for at least one fixed twisted pair, which links together all the connection points and through which standardized messages or packets flow in transit. A storage memory is used to record the state of being busy of the twisted pairs, and the mechanisms for managing the wideband resources.

Figure 4:
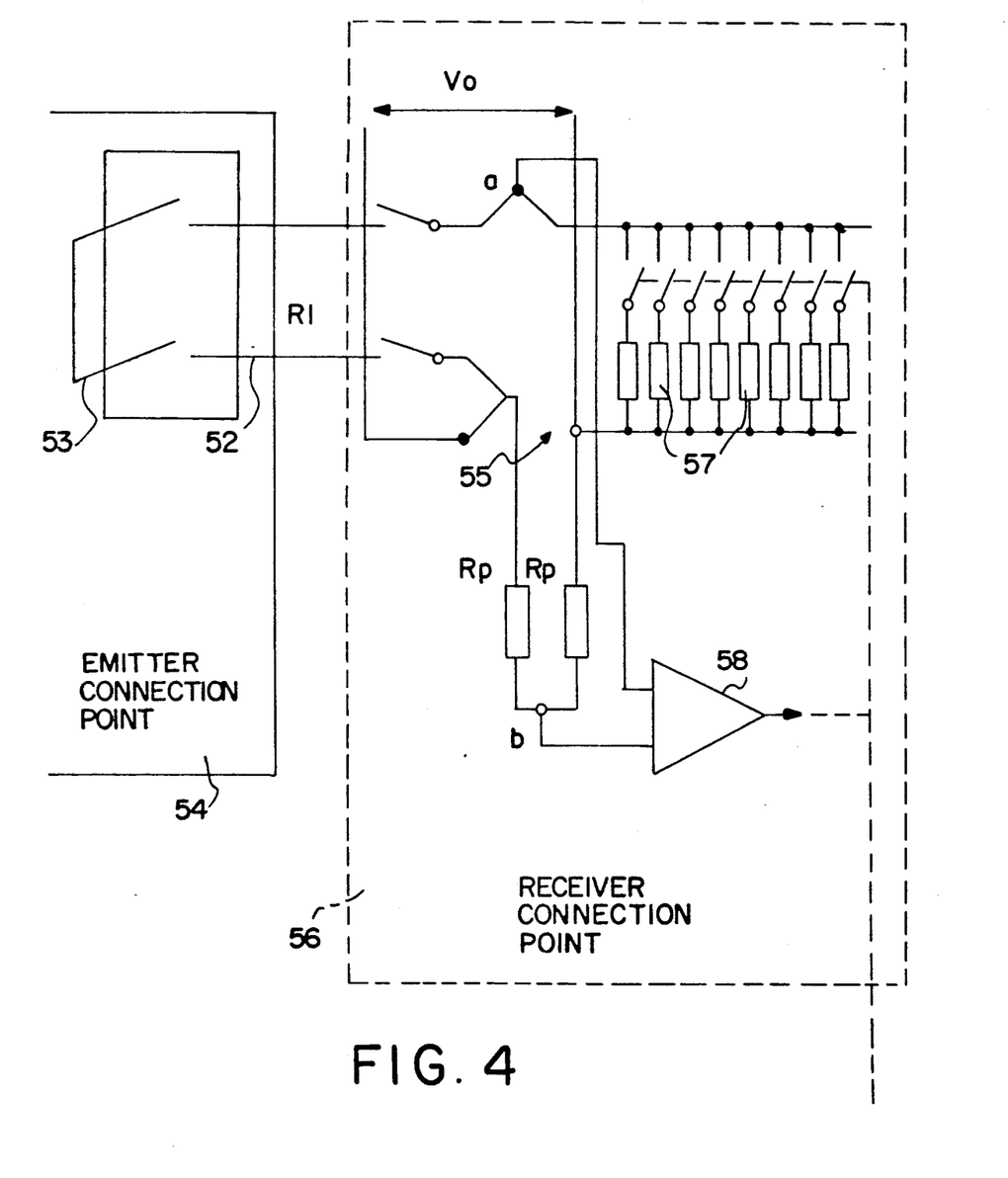
FIG. 4 shows an advantageous embodiment of an automatic equalization module which can be implanted at a reception connection point of the network according to the invention.

FIG. 4 shows an advantageous embodiment of means for the equalization of the signal received at a connection point, as a function of the electrical distance between this connection point and the point of emission of the signal on the network.

For, the bunch 10 of twisted pairs, like any support, weakens the signal according to the distance. To take into account the selective attenuation that takes place as a function of the frequencies, the invention provides for means to equalize the signal received, advantageously implanted at each connection point of the signals liable to work in reception mode.

The equalising means should imperatively be used for the reception of video signals. For the lines used either at a low throughput rate or in sound mode, there is no need to provide for corrections.

In the embodiment shown in FIG. 4, the equalization means consist of a series of selectively switchable equalization cells. These cells are RC type passive circuits. The RC circuits are, for example, connected to the feedback pins of the reception integrated circuits. In the example shown, each cell is individually connected, depending on the magnitude of the equalization operation to be performed. The principle consists in determining a typical length of a twisted pair beyond which the signal is outside a template determined as a function of the nature of the signals conveyed in the medium and of their passband. Each cell then corresponds to the equalization function with a multiple distinct from this typical length.

Thus, for a cable with twisted pairs having a gauge 28 (AWG28) in which 0–12 MHz passband signals are conveyed, 8 fictitious sections can be defined on a length of 150 meters. A table, in the ROM, read by the connection point, sets up a correspondence, for each equalization cell, of the interval of length, for which it provides a correction. For example, the cell 1 will correct a length, travelled by the signal, of about 40 meters, the cell 2 will correct 60 meters, . . . , the cell 8 will correct 150 meters.

Other embodiments of the cells can also be considered without going beyond the scope of the invention.

A first mode of measurement of the distance travelled by the signal received in the network consists in memorizing, for each connection, its length with respect to a reference point O of the network. The distance between two connection points is then computed by algebraic substraction between the respective distances from two connection points to the reference point.

The marking of the specific distance from each connection point to the reference point can be done, for example, manually during the implantation of the wired network, by the flipping-over of encoding change-over switches or equivalent devices.

The position of a connection point with respect to the reference point may be transmitted at any moment in responding to a particular message emitted on the signalling line.

The approach shown in FIG. 4 corresponds to an automated version of the computation of distance.

When the connection of a receiver to the bus is requested, a line 52 is put into short-circuit 53 on the emitter 54 side, for a time fixed for all the connection points. This line in short-circuit is placed in an arm of a Wheatstone bridge 55, on the receiver 56 connection point. To the other arm of the bridge, there is connected a resistor 57 consisting of 8 values. Each resistor 57, or a combination of elementary resistors 57, corresponds to the resistance of the line for different equalization steps.

So long as the Wheatstone bridge is not balanced, the comparator 58 gives a voltage putting into effect the switching over of another elementary resistor 57, and hence of a distinct equalization cell.

Figure 5:
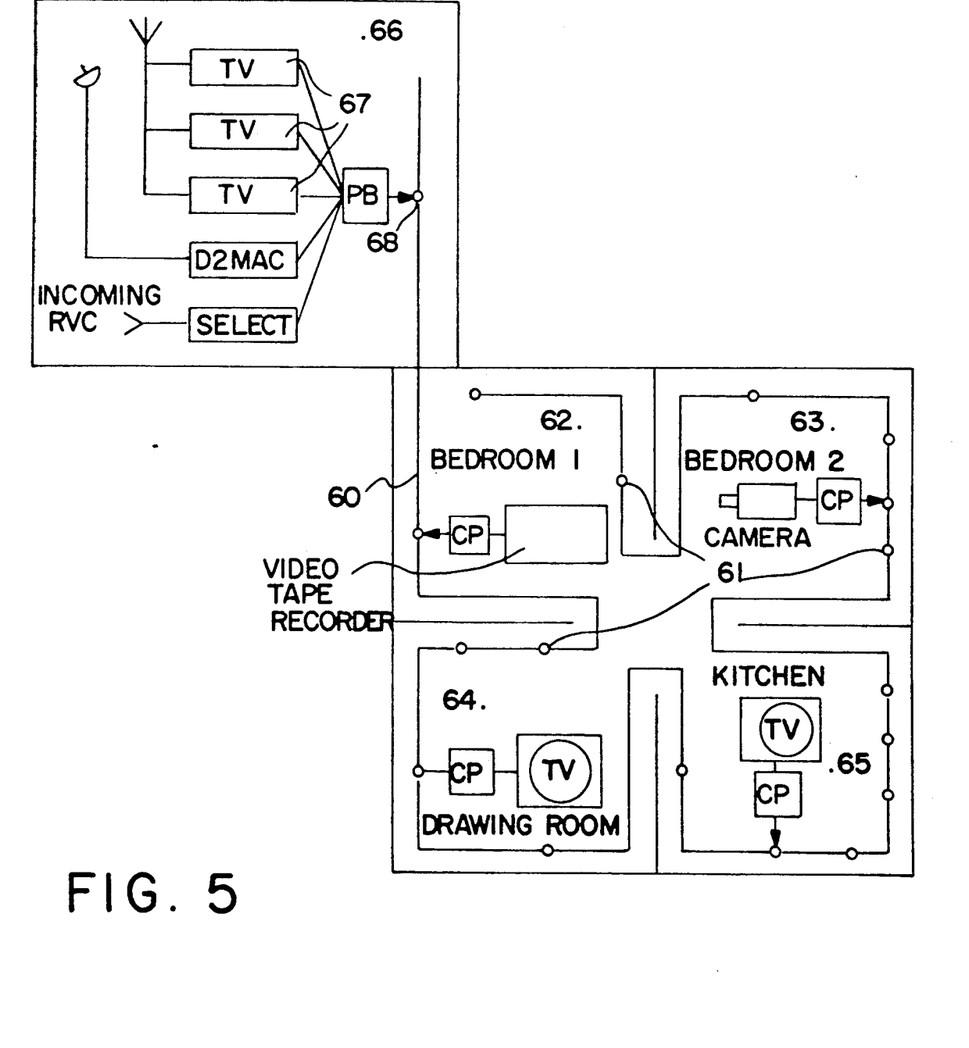
FIG. 5 illustrates a preferred mode of implantation of a network according to the invention, in individual dwellings.

FIG. 5 gives a schematic view of a method for assigning an identification number to a device connected to the network according to the invention.

Advantageously, any newly connected device will be assigned an address consisting, firstly, of an identifier of the type of device and, secondly, an identifier of the individual character of the device.

The device type identifier enables the identification of the (standardized) position of the connection elements on the connector of the device and, hence, enables the control of the switching matrix.

The identifier of the individual character of the device consists either of an identification number or a mnemonic identifier chosen by the user (drawing room television set, children's video tape recorder etc.) or any other alphanumeric code.

The configuration of the network assumes that an identifier called TE1 is assigned to each connection point. This procedure is carried out by the emission of multiplexed messages on the pair of signalling conductors common to all the connection points.

When the connection point is put under voltage, the user has to configure it either, for example, by using switches indicating the type of device used or by undertaking a dialogue with the connection point by means of a videotex type terminal connected to the bidirectional control input to enter the mnemonic identifiers used.

The connection point then broadcasts a search for a free TE1 number on the pair of signalling conductors, in emitting an un-numbered frame. This frame has, for example, a service identifier, a broadcast TE1 containing a random reference as information and a preferred TE1 number. The random reference of the frame enables the making of a distinction among several almost-simultaneous messages of requests for the assigning of an identifier by several connection points.

If no rejected identity frame containing the random reference of the connection point is received during a fixed period T, the frame requesting the assigning of TE1 is re-emitted for N times before it is decided that the preferred TE1 is not used in the network. A decision such as this then makes it possible to attach the mnemonic identifier, chosen by the user, to this TE1.

Should a general manager supervise the network, using a table on the status of the connections of devices, the TE1 may be assigned to the mnemonic identifier as soon as the message of acceptance is received, without re-emission of the assignment requesting message.

By contrast, if a rejected identity frame containing the random reference of the connection point is received in the period T, it means that there is an identical TE1 already assigned to the network. The value of the preferred TE1 therefore has to be modified, for example by incrementing its value by one unit and then re-emitting a new assignment-requesting frame.

Advantageously, the formats of identity request, accepted identity and rejected identity frames are in accordance with the ISDN format.

Should a list of devices connected to the network be memorized, each article of said list corresponds to a distinct device and comprises said logic address of the device (type of device and individual identifier) as well as, advantageously, a piece of information on the status, whether active or idle, of the link of said device with the network. This list is updated at each modification of a connection and/or of an interconnection in the network.

Advantageously, a priority level is associated with each device. The priority level is taken into account in such a way that the connection establishing procedures favor the connections set up as a function of the priority level of the device, having the greatest priority, of each connection.

When a user wishes to create a wideband connection between devices, he connects his videotex unit to the connection point closest to him. The connection stage shows up the map of the audio-visual devices connected to the BUS and capable of being connected up. This map is drawn up in real time through the broadcasting of a "who is connected?" request primitive. Each active connection point sends back its TE1 value and its user mnemonic identifier. Another broadcasting primitive is used to find out which devices are emitting wideband signals on the bus.

The user can set up a connection among devices by emitting a connection request comprising the number of the source device, its sub-address indicating the type of device and, hence, the number of lines required, its degree of priority, the number of the destination device, its sub-address indicating the type of device, its degree of reception priority. The emitting connection point which receives the requests sets up the connection with the receiver, in using lines of the free buses. Once the connection is made, an acknowledgment is sent back to the connection point that has emitted the request in order to inform the user that the request has or has not been complied with.

In other words, the procedure for requesting the setting up of a connection between an emitter and a receiver in said network consists in:

emitting a request for a connection comprising the logic address of the emitter and the logic address of the receiver comprising parameters (priority levels, terminal, line, position on the cable etc.);

obtaining, from each of the connection points of said emitter and receiver, a piece of information on the existence of pairs of conductors which are either already carriers of signals implicated by the connection requested or available in sufficient number to establish said connection requested;

setting up or aborting said connection requested as a function of the value of said information on existence.

To cut off a wideband connection, the user causes all the connections to be seen. He may ask for the disconnection of either an emitter or a receiver. Depending on the degree of priority used, on whether the mode of use is single or multiple, the device may or may not be disconnected.

The domestic audio-visual bus also enables the broadcasting, to all the receivers, of the status of the slow switching of the emitter that is connected to them and the broadcasting, to all the devices on the bus, of the pieces of information on the control of the devices themselves, depending on a user priority level (such as parental priority, supervision priority etc.). These messages of items of information are conveyed in packets of data.

When the user decides to move a piece of audio-visual equipment in his home, for example the children's television set from the bedroom to the kitchen, he can either move the television unit and the associated connection point or move the audio-visual equipment only to reconnect it to another free connection point.

In the former case, the value of TE1 and the associated mnemonic identifiers may be kept. In the latter case, the user has to reconfigure the new connection point in order to assign it its new mnemonic identifiers. The entry into the stage of configuring the connection point causes the resetting of the preceding TE1 and a new stage of assigning TE1.

FIG. 5 gives a schematic view of the layout of the network of the invention in an individual dwelling.

In principle, a 150 m. bus 60, provided with connection points 61 in the various rooms 62, 63 of the dwelling, should be capable of coping with the majority of wirings in new or renovated individual dwellings. However, there is nothing to prohibit the use, for example, of two buses directly connected to each other, or using an intermediate transfer bus. In all cases, connection points acting as repeaters will be used. The demodulators 67 have all been combined at one and the same place 66, and the signals are injected into a single connection point 68. This configuration is not indispensable.

Figure 6:
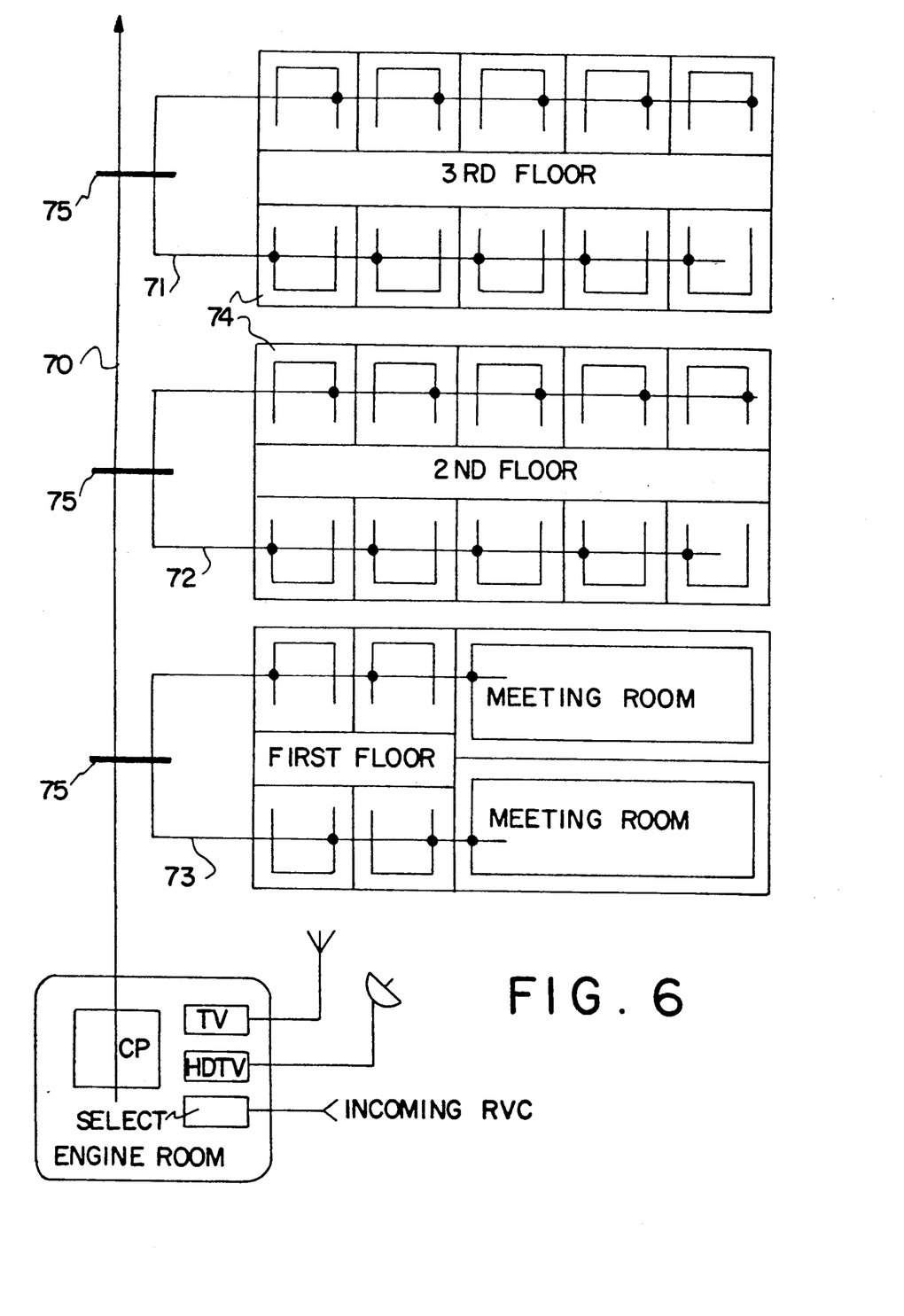
FIG. 6 illustrates a preferred mode of implantation in group dwellings such as hotels or hospitals.

FIG. 6 shows an example of the wiring of a group dwelling such as a hotel, hospital etc.

One or more primary buses 70 are used, depending on the size of the building. On each floor, one or more secondary buses 71, 72, 73 recover the signals to convey them to the rooms 74. Particular arrangements can be made in certain special-purpose rooms such as (conference halls, meeting rooms etc.). These particular arrangements consist in:

either assigning certain specific pairs to them on the bus;

or wiring them with a specific bus.

These rooms or halls can then function while providing secrecy with respect to the rest of the installation, or can be connected to the general network or, as the case may be, generate a program to broadcast it.

Tests have been made on a network of the above-described type, provided with 16 twisted copper pairs. The tappings of the signals on the twisted pairs, driven symmetrically, were done at low-level (300 mV c/c) with NE 592 type integrated circuits.

The following table illustrates the qualities obtained, which are in accordance, in level, with the Peritel standard.

| AUDIO | | VIDEO | |
|---|---|---|---|
| Distortion | 0.5% | Differential gain | >2% |
| Crosstalk | 85 dB | Differential phase | >2% |
| Passband | 15 kHz | Passband | >12 MHz |
| | | Photonic crosstalk | >42 dB |
| Signal/noise | 79 dB | Signal/noise | >65 dB |

What is claimed is:

1. A reconfigurable in-house multiplepoint wired network for the simultaneous and/or alternative distribution of several types of data including, notably, audio-visual signals comprising, amongst others, baseband image signals, among sets of devices, each comprising at least one unit for the injection of signals into the network and at least one unit for the reception of said signals, each said unit capable of being connected, without distinction, at different connection points of the network, a network of the type formed by at least one line for the transmission of said signals provided with connection points of said units to the network, distributed over the length of said line, wherein each transmission line is formed by a twisted pair of conductors comprising at least one input point for the connection of a unit for the injection of a signal into said pair of conductors; and several output points for the connection of units for tapping said signal transmitted on the pair of conductors, where each of said at least one input point comprises means for the symmetrical injection of the signal on the two wires of said pair of conductors, said means for the injection having a high impedance with respect to the impedance of said pair, and wherein each of said output points comprises means for the symmetrical tapping of the signal on the two wires of said pair, said means for the tapping having a high impedance with respect to the impedance of said pair of conductors, compatible with a multiple tapping of the signal on the pair of conductors.

2. A network according to claim 1, wherein at least one of said connection points is an input/output point comprising, at the same time, firstly, means for the injection of a signal into said pair of conductors and, secondly, means for the tapping of the signal transmitted at low level on said pair of conductors, as well as means for the selection of the operation mode of said connection point, in injection and/or in reception.

3. A network according to claim 1, wherein each of said output points of the network comprises adjustable means for equalization of the level of the signal received with respect to the signal injected into the network, as a function of the electrical distance between said output point and the injection point of the signal in said pair of wires, said means for equalization comprising means for determining said electrical distance.

4. A network according to claim 3, wherein said equalization means comprise means for the memorization, at each connection point, of its electrical distance with reference to a single reference point on said pair of conductors, and means for the computation of the electrical distance between two connection points of said pair of conductors by algebraic substraction of their respective distance from said reference point.

5. A network according to claim 3, wherein said equalization means comprise:

means for the temporary short-circuiting of a line at a first of said injection connection points;

means for measuring the electrical resistance of said short-circuited line, seen from the second of said connection points, which is representative of said electrical distance;

means for selection of an adjusted value of equalization as a function of said measured electrical resistance.

6. A network according to claim 3, wherein said equalization means comprise distinct, selectively switchable, equalization cells, alone or in combination, as a function of said electrical distance, namely electrical resistance measured respectively.

7. A network according to claim 1, comprising:
a bunch of lines formed, firstly, by several twisted pairs of conductors for the transmission of useful signals and, secondly, by at least one signalling line,
a set of connection sockets with multiple contacts, each connection contact of which is connected to a pair of conductors of said bunch;
a set of multiple-contact connectors for the connection of said units, each having connection elements dedicated to the transmission/reception of a specific signal per type of unit;
a set of switching matrices, each matrix being interposed between a connection socket and an associated connector for the selective and reconfigurable making of contact of each connection element of the unit connector with the connection contact of the socket connected with the pair of conductors carrying the corresponding signal to said dedicated connection elements;
means for the control of each of said switching matrices, for setting up and breaking off each unit connection with the network, comprising, firstly, means to emit control signals on said signalling line and, secondly, a control element specific to each switching matrix connected to said signalling line.

8. A network according to claim 7, formed by at least two bunches of twisted pairs of conductors connected by repeater.

9. A network according to claim 7, wherein said signalling line is formed by at least one twisted pair of conductors.

10. A network according to claim 7, wherein said means for the emission of control signals are formed by an emitter connectable to any point of the network, of a videotex terminal type.

11. A network according to claim 7, wherein said means for the emission of control signals include a piece of supervision equipment capable of creating automatic connections.

12. A method for the configuration of a network according to claim 7, wherein a logic address is attributed to each device connected to a connection point of the network, said logic address being formed by two distinct fields:
a first field identifying the type of device and, hence, the locating of the position of each of the connection elements dedicated to the connector of said device;
a second field specifically identifying said device in an individualized way.

13. A method according to claim 12, wherein said second field is formed by an alphanumeric code comprising an order number and/or a mnemonic identifier chosen by the user.

14. A method according to claim 12, comprising an iterative procedure for the assigning, to each device newly connected to the network, of an individual identification number, said procedure consisting in:
emitting, at least once on the signalling line, a test message containing a first candidate number value;
testing a new candidate number at each rejection of the current candidate number, by a device already connected to the network and/or by a piece of supervisory equipment of said network;
assigning said candidate number to said device when there is no rejection.

15. A method according to claim 12, wherein a list of connected devices is memorized, each article of said list corresponding to a separate device, and comprising said first and second fields of the logic address of the device, as well as a piece of information on the status, whether active or idle, of the link of said device with the network.

16. A method according to claim 12, comprising a procedure for requesting the setting up of a connection between an emitter and a receiver on said network, consisting in:
emitting a connection request comprising the logic address of the emitter and the logic address of the receiver;
obtaining, from each of the connection points of said emitter and receiver, a piece of information on the existence of pairs of conductors which are either already carriers of signals implicated by the connection requested or available in sufficient number to establish said connection requested;
setting up or aborting said connection requested as a function of the value of said information on existence.

17. A method according to claim 12, wherein a priority level is assigned to each device, and wherein the procedures for setting up connection, in the event of saturation of the network, favor the connections made as a function of the level of priority of the device with the highest priority of each connection.

18. A method for the configuration of a network according to claim 7, notably for the transmission of image signals in Peritelevision, wherein the so-called slow switching information of said image signals is broadcast on said signalling line.

19. A method for the configuration of a network according to claim 7, wherein items of remote control information of an emitter are transmitted in the network in said signalling line.

* * * * *